United States Patent [19]

Schaefer et al.

[11] Patent Number: 5,275,477
[45] Date of Patent: Jan. 4, 1994

[54] HYDRAULIC DUAL-CIRCUIT BRAKE SYSTEM

[75] Inventors: Jochen Schaefer, Bietigheim-Bissingen; Karl-Heinz Wilimann, Freiberg/N, both of Fed. Rep. of Germany

[73] Assignee: Robert Bosch GmbH, Stuttgart, Fed. Rep. of Germany

[21] Appl. No.: 26,159

[22] Filed: Mar. 3, 1993

Related U.S. Application Data

[62] Division of Ser. No. 819,714, Jan. 13, 1992, Pat. No. 5,211,454.

[30] Foreign Application Priority Data

Jan. 31, 1991 [DE] Fed. Rep. of Germany ....... 4102864

[51] Int. Cl.$^5$ ............. B60T 8/32; B60T 8/44; B60T 8/48; B60K 28/16
[52] U.S. Cl. ............. 303/113.2; 303/116.1; 303/119.1; 180/197
[58] Field of Search ............. 303/113.1, 113.2, 113.3, 303/116.1, 116.2, 116.3, 119.1, 119.2; 180/197

[56] References Cited

U.S. PATENT DOCUMENTS

| | | | |
|---|---|---|---|
| 4,826,258 | 5/1989 | Ocrirk et al. | 303/113.2 |
| 4,846,532 | 8/1989 | Friedow et al. | 303/110 |
| 4,861,118 | 8/1989 | Burckhardt | 303/113.2 |
| 5,026,127 | 6/1991 | Arikawa | 303/116.1 |
| 5,102,205 | 4/1992 | Stegmaier | 303/113.2 |
| 5,123,716 | 6/1992 | Willmann | 303/113.2 |
| 5,205,623 | 4/1993 | Holzmann et al. | 303/113.2 |
| 5,211,454 | 5/1993 | Schaefer et al. | 303/113.2 |
| 5,217,284 | 6/1993 | Willmann | 303/113.2 |

FOREIGN PATENT DOCUMENTS 3800854 7/1989 Fed. Rep. of Germany .

*Primary Examiner*—Robert J. Oberleitner
*Assistant Examiner*—Chris Schwartz
*Attorney, Agent, or Firm*—Edwin E. Greigg; Ronald E. Greigg

[57] ABSTRACT

A hydraulic dual-circuit brake system, with an anti-skid system (ABS) and traction control (ASR) for motor vehicles having a four-channel hydraulic unit with control valves, a return pump with two separate pump elements for each brake circuit, and two low-pressure reservoirs connected to the inlets of the pump elements. For supplying brake pressure in the traction control mode, at least one brake fluid reservoir is provided, which communicates with a pump element assigned to a brake circuit having at least one driven wheel, and a reversing valve is disposed in each connecting line between the master brake cylinder and the outlet of such a pump element. For the sake of problem-free initiation of braking during the traction control mode without the danger of unstable driving conditions, the brake fluid reservoir is embodied as an active, controllable reservoir, and the reversing valve is embodied such that in its reversed position a check valve having a blocking direction toward the master brake cylinder is operative.

4 Claims, 8 Drawing Sheets

HYDRAULIC DUAL-CIRCUIT BRAKE SYSTEM

This is a divisional of copending application Ser. No. 07/819,714 filed on Jan. 13, 1992, now U.S. Pat. No. 5,211,454.

RELATED APPLICATION

This invention is co-pending with application Ser. No. 07/674,841 filed Mar. 25, 1991, now U.S. Pat. No. 5,123,716, in the U.S. Patent and Trademark Office, and assigned to the same assignee.

BACKGROUND OF THE INVENTION

The invention is based on a hydraulic dual-circuit brake system with an anti-skid system (ABS) and traction control (ASR) for motor vehicles.

In a known dual-circuit brake system of this type, with front-axle/rear-axle brake circuit distribution (German Patent 38 00 854 A1; U.S. Pat. No. 4,846,532), the brake fluid reservoir is embodied by the pressure chamber of a vacuum cell, which in traction control can be connected by means of a switching valve to the inlet of the pump element of the return pump assigned to the brake circuit for the driven wheels of the rear axle. The vacuum cell is divided by a diaphragm into two chamber sections. The diaphragm is connected to a pressure piston that is axially displaceable in the pressure chamber counter to a restoring spring and as a result produces a brake fluid pressure. To fill the pressure chamber with brake fluid, a vacuum is generated in the vacuum cell, so that the pressure piston, under the force of the restoring spring, makes the largest possible volume available in the pressure chamber; via the switch valve, this volume is filled with brake fluid from the master brake cylinder or from a separate brake fluid tank. In traction control, the outer chamber segment of the vacuum cell is vented. The negative pressure remaining in the other chamber segment effects a return of the diaphragm, which carries the pressure piston with it counter to the force of the restoring spring and thus generates a brake fluid pressure in the pressure chamber. Via the reversed switch valve, the brake fluid is fed at sufficient charge pressure into the pump element of the return pump. Simultaneously, the reversing valve in the connecting line between the master brake cylinder and the brake circuit of the driven wheels is reversed, so that that brake circuit is disconnected from the master brake cylinder.

During the entire traction control process, the vacuum cell generates a charge pressure that varies slightly and is adequate to supply the return pump with brake fluid. The return pump thus generates a permanently high brake supply pressure, which is above the maximum possible brake pressure of the wheel brake cylinders. The brake pressure necessary for braking a spinning driven wheel is established by constant switching of the control valve, assigned to this driven wheel, between a pressure buildup position and a pressure holding or pressure reduction position in the wheel brake cylinder of the spinning driven wheel.

If the brake pedal is actuated during traction control, then if no other provision is made a brake pressure buildup in the wheel brake cylinders of the wheels of the driven axle is not possible, while such a brake pressure is built up in the wheel brake cylinders of the wheels of the non-driven axle. This unilateral buildup of brake pressure leads to unstable road handling situations, which must be avoided. One such particular provision to avoid these unstable road-handling situations is that both the reversing valve and the switch valve are restored upon brake pedal actuation, so that on the one hand the communication between the master brake cylinder and the brake circuit of the driven wheels is re-established, and on the other the brake fluid reservoir is again disconnected from the brake circuit of the driven wheels. An electric signal transducer that recognizes the actuation of the brake pedal is necessary for this purpose. A brake light switch is typically used as such a signal transducer. However, if it should fail, the aforementioned disadvantage of unstable driving conditions arises.

OBJECT AND SUMMARY OF THE INVENTION

The dual-circuit brake system according to the invention has an advantage over the prior art that initiation of braking during traction control is unproblematic and does not lead to unstable vehicle performance, which in the case of front-wheel drive vehicles for instance arise from overbraking of the rear axle. Even if a brake light switch optionally provided for the restoration of the reversing valve fails, it is assured that the necessary brake pressure will be established both in the wheel brake cylinders of the driven wheels and in those of the non-driven wheels. This is assured on the one hand by the check valve, disposed in the connecting line of the master brake cylinder to the control valves assigned to the driven wheels, which becomes operative upon switchover of the reversing valve, and on the other hand is assured in that for brake pressure buildup during traction control, the brake pressure is not established by switching of the control valves at an approximately constant brake supply pressure generated by the return pump, but rather by controlling the charge pressure of the brake fluid reservoir. The control valves of the driven wheels are therefore always in their open position, and the brake pressure established in the wheel brake cylinder prevails in the entire line region as far as the check valve in the connecting line to the master brake cylinder, so that upon initiation of braking this brake pressure can be transmitted by the brake pressure of the master brake cylinder, via the check valve.

As in the prior art, the closed brake circuit is maintained during traction control in the dual-circuit brake system of the invention as well. Any possible leakage losses can be compensated for via the control valves assigned to the driven wheels, to this end, in a further embodiment of the invention, these valves comprise two separate 2/2-way magnet valves, each forming one inlet and outlet valve, the outlet valves being switched over into its open position, so that the brake fluid reservoir, via the opened inlet and outlet valves, and the corresponding connecting lines to the brake circuit outlets, communicate with the master brake cylinder.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
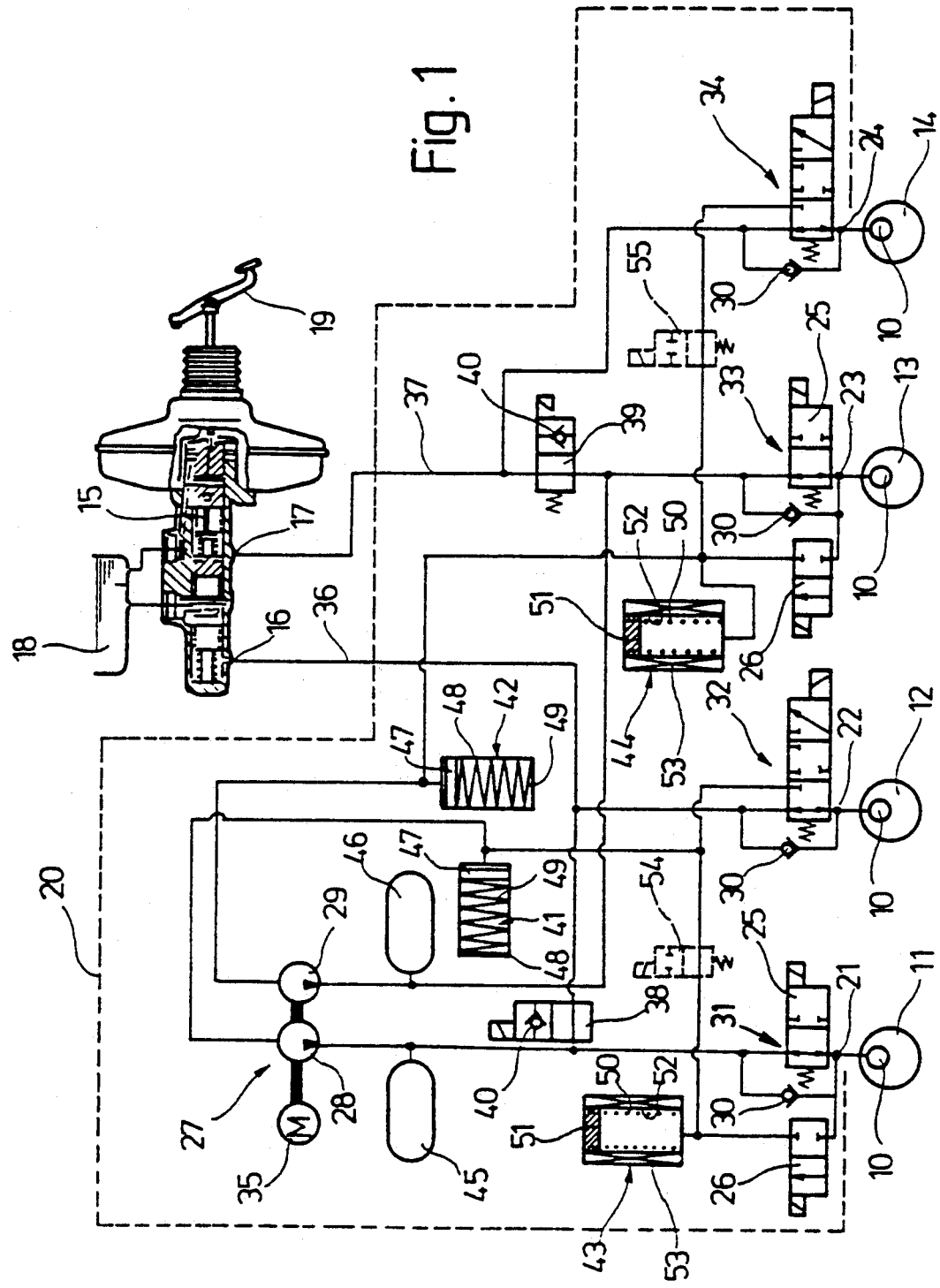
FIGS. 1 to 4 each show a block circuit diagram of a dual-circuit brake system with diagonal brake circuit distribution, an anti-skid system and traction control for a passenger car, in various exemplary embodiments.

In the hydraulic dual-circuit brake system with diagonal brake circuit distribution, an anti-skid system (ABS) and traction control (ASR) shown in the form of a block circuit diagram in FIG. 1 and intended for a passenger car, the driven wheels, which are generally mounted on the front axle, are represented by numerals 11 and 13, and the non-driven wheels of the rear axle are represented by the numerals 12 and 14. The wheel brake cylinders 10 of the driven and non-driven wheels 11 to 14 belong to different brake circuits, so that one driven wheel 11 or 13 and one non-driven wheel 12 or 14 are present in each brake circuit.

In a manner known per se, the dual-circuit brake system includes a master brake cylinder 15, which has two separate brake circuit outlets 16, 17 each for the connection of one of the two brake circuits, and which communicates with a brake fluid tank 18. Upon actuation of the brake pedal 19, a brake pressure of equal magnitude is controlled at both brake circuit outlets 16, 17. The dual-circuit brake system also includes a four-channel hydraulic unit 20, which has four outlet channels 21 to 24, to each of which one wheel brake cylinder 10 of the wheels 11 to 14 is connected. One control valve 31 to 34 is assigned to each outlet channel 21 to 24. The control valves 31 to 34 are controlled by control electronics, not shown here. The control valves 32, 34 for the non-driven wheels 12, 14 are embodied as 3/2-way magnet valves with spring restoration, while the control valves 31, 33 of the driven wheels 11, 13 each comprise one inlet valve 25 and one outlet valve 26, which are embodied as 2/2-way magnet valves with spring restoration. Each control valve 31 to 34 is by-passed by a one-way check valve 30, the blocking direction is toward the outlet channel 21 to 24. A return pump 27, which is a component of the four-channel hydraulic unit 20, has two pump elements 28, 29, which are driven in common by an electric motor 35. The pump elements 28, 29 serve to return brake fluid to the master brake cylinder 15 upon a pressure reduction in the wheel brake cylinders 10. One pump element 28, 29 each is operative in one brake circuit, and can be made to communicate on the input side with the wheel brake cylinders 10 of the vehicle wheels 11 to 14, in each case, via the two control valves 31, 32 or 33, 34 assigned to the same brake circuit, and on the output side communicates via a connecting line 36, 37 with the brake circuit outlets 16, 17 of the master brake cylinder 15. The pump elements 28, 29 are provided in a conventional manner with one pump one-way inlet valve and one pump one-way outlet valve each, which are not shown here for the sake of simplicity. One reversing valve 38 and 39 is disposed on each of the connecting lines 36, 37, respectively. Each reversing valve 38, 39 is embodied as a 2/2-way magnet valve with spring restoration, which is open in its basic position and makes the applicable connecting line 36 to 37 fluid passable, and in its reversed position connects a check valve 40, the blocking direction of which is toward the master brake cylinder 15, into the applicable connecting line 36 or 37. The inlet valve 25 of the control valve 31 is connected to the outlet of the pump element 28, and the inlet valve 25 of the control valve 33 is connected to the outlet of the pump element 29, while the control valves 32, 34 of the non-driven wheels 12, 14 are connected to the applicable brake circuit outlet 16 or 17 to which they are assigned of the master brake cylinder 15. A low-pressure reservoir 41 and 42 and a brake fluid reservoir 43 and 44, respectively, are connected to the inlet of each pump element 28, 29, while a respective damping chamber 45 and 46 is connected to the outlets of the pump elements 28, 29. The low-pressure reservoirs 41, 42 are identically embodied and have a spring-loaded reservoir piston 47, which is axially displaceable in a reservoir cylinder 48. The low-pressure reservoirs 41, 42 are capable of receiving excess brake fluid, and the reservoir piston 47, with the compression of the reservoir spring 49, is displaced into the reservoir cylinder 48.

The two brake fluid reservoirs 43, 44 are identical and are each embodied as active reservoirs that are controllable in terms of the reservoir or charge pressure generated inside them. Each brake fluid reservoir 43, 44 has a reservoir piston 51 that is loaded by a reservoir spring 50 and is axially displaceably guided in a reservoir cylinder 52. The reservoir piston 51 is drivable for the axial displacement here by means of an electromagnet 53, symbolized here by its coil winding. Depending on the magnitude of magnet excitation, the reservoir piston 51 executes a defined piston stroke. The reservoir piston 51 may instead be driven in the same manner by an electric motor, compressed air or a vacuum.

The modes of operation of the dual-circuit brake system upon brake pedal actuation and in ABS operation are known, so that no further detail of these modes needs to be provided here. In the ABS mode, the necessary brake pressure is established by switching of the control valves 31 to 34, with the control valves 31 to 34 being switched back and forth between a pressure buildup, pressure holding and pressure reduction position. In the pressure reduction position, the wheel brake cylinders 10 communicate with the low-pressure reservoirs 41, 42, which temporarily hold the volume of brake fluid flowing out of the wheel brake cylinders 10. The pump elements 28, 29 of the switched-on return pump 27 pumps the outflowing volume of brake fluid back to the master brake cylinder 15, as a result of which the low-pressure reservoirs 41, 42 are pumped empty again. In traction control operation, accordingly whenever at least one of the driven wheels 11, 13 is exhibiting slip, the control electronics switch over the two reversing valves 38, 39, so that the check valves 40 are each connected into the connecting lines 36, 37. Both the pump elements 28, 29 and the inlet valves 25 of the control valves 31, 33 assigned to the driven wheels 11, 13 are thus blocked off from the master brake cylinder 15, while the control valves 32, 34 of the non-driven wheels 12, 14 continue to communicate with the master brake cylinder 15 as before. At the same time, the return pump 27 is switched on, and the two brake fluid reservoirs 43, 44 are activated. The brake fluid reservoirs 43, 44 each generate a charge pressure for the pump elements 28, 29, which in turn feed a high brake pressure into the wheel brake cylinders 10 of the driven wheels 11, 13, via the inlet valves 25, which are in their basic position, of the control valves 31, 33. If only one driven wheel 11 or 13 is spinning, then only the brake fluid reservoir 43 or 44 assigned to the spinning driven wheel 11 or 13 is activated. Since the pump elements 28, 29 of the return pump 27 are not embodied as self-aspirating, no brake pressure is therefore built up in the wheel brake cylinder 10 of the non-spinning driven wheel 11 or 13. The brake pressure in the wheel brake cylinder 10 required for braking the spinning driven wheel 11 or 13 is established by control of the charge pressure of the brake fluid reservoir 43 or 44. The inlet valves 25 are not triggered at this time. If only a low brake pressure is needed in the wheel brake cylinders 10, then the brake fluid reservoir 43 or 44, by corresponding control of the drive force of the reservoir piston 51, generates a relatively low charge pressure. If a higher brake pressure is necessary, then the brake fluid reservoir 43 or 44 of the return pump 27 makes a higher charge pressure available. Once the required brake pressure in the wheel brake cylinder 10 has been attained, the activation of the brake fluid reservoir 43 or 44 is cancelled. If the brake pressure in the wheel brake cylinder is to be reduced again after braking of the driven wheel 11 or 13 has occurred, then the outlet valve 26 of the control valve 31 or 33 is additionally reversed, so that a volume of brake fluid can now flow out of the wheel brake cylinder 10 into the brake fluid reservoir 43 or 44. At the end of the traction control operation, the low-pressure reservoir 41 or 42 is pumped empty by the pump elements 28 or 29, and all the brake fluid is pumped back into the brake fluid reservoir 43 or 44, via the inlet valve 25 and the reversed outlet valve 26. Next, the outlet valve 26 of the control valve 31 or 33 is reset, and the return pump 27 is switched off.

If the brake pedal 19 is actuated during the traction control mode, then the brake pressure is fed directly into the wheel brake cylinders 10 of the non- driven wheels 12, 14, via the brake circuit outlets 16, 17 and the control valves 32, 34, which are in their basic position. If the brake pressure controlled by the master brake cylinder 16 is higher than the brake pressure established at the moment in the wheel brake cylinders 10 of the driven wheels 11, 13 during the traction control mode, then the check valve 40 opens into the connecting lines 36, 37, and the higher brake pressure of the master brake cylinder 15 is fed into the wheel brake cylinders 10 of the driven wheels 11, 13. An approximately equally high brake pressure is thus built up at both the front and the rear axles, and overbraking of the rear axle, which is the cause of unstable driving conditions, is reliably avoided.

In the traction control mode the attempt is made to prevent any reservoir piston motion in the low-pressure reservoir 41 or 42. The reservoir spring 50 must be suitably dimensioned for this purpose. If doing so presents problems, then the low-pressure reservoir 41 or 42 can be decoupled during the traction control mode by a cutoff valve 54 or 55, as shown in dashed lines in FIG. 1. The cutoff valve 54 or 55 is embodied as a 2/2- way magnet valve with spring restoration, which is connected in the connection line of the low-pressure reservoir 41 or 42 to the inlet of the associated pump element 28 or 29. In the unexcited basic position, the cutoff valve 54 or 55 is opened, so that the low- pressure reservoir 41 or 42 communicates with the pump element 28, 29, and in its reverse position it closes, thereby disconnecting the low-pressure reservoir 41 or 42 from the pump element 28 or 29.

Figure 2:
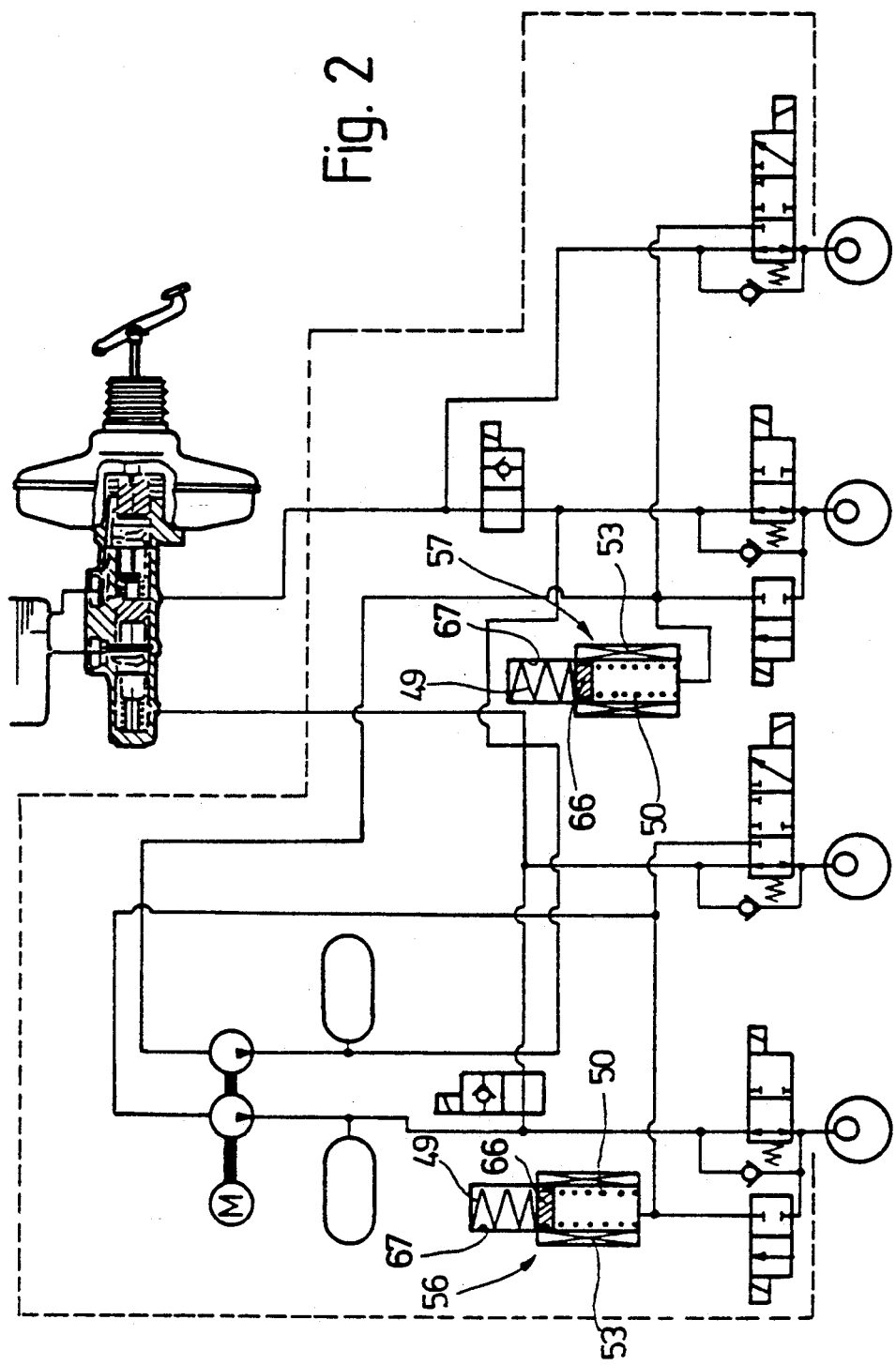

In the dual-circuit brake system of FIG. 2, the low-pressure reservoir 41 and 42 and the brake fluid reservoir 43 and 44 have been combined into a single reservoir in each brake circuit, that is, a so-called combined reservoir 56 or 57. The reservoir cylinder 48, 52 on the one hand and the reservoir pistons 47, 51 on the other, of the low-pressure reservoir 41 or 42 and of the brake fluid reservoir 43 or 44, are combined into a single reservoir cylinder 67 and reservoir piston 66, respectively. The latter is acted upon both by the reservoir spring 49 of the low-pressure reservoir 41 or 42 and by the reservoir spring 50 of the brake fluid reservoir 43 or 44. Otherwise, the dual-circuit brake system matches that of FIG. 1 in both structure and function, so no further reference numerals have been included in FIG. 2.

Figure 3:
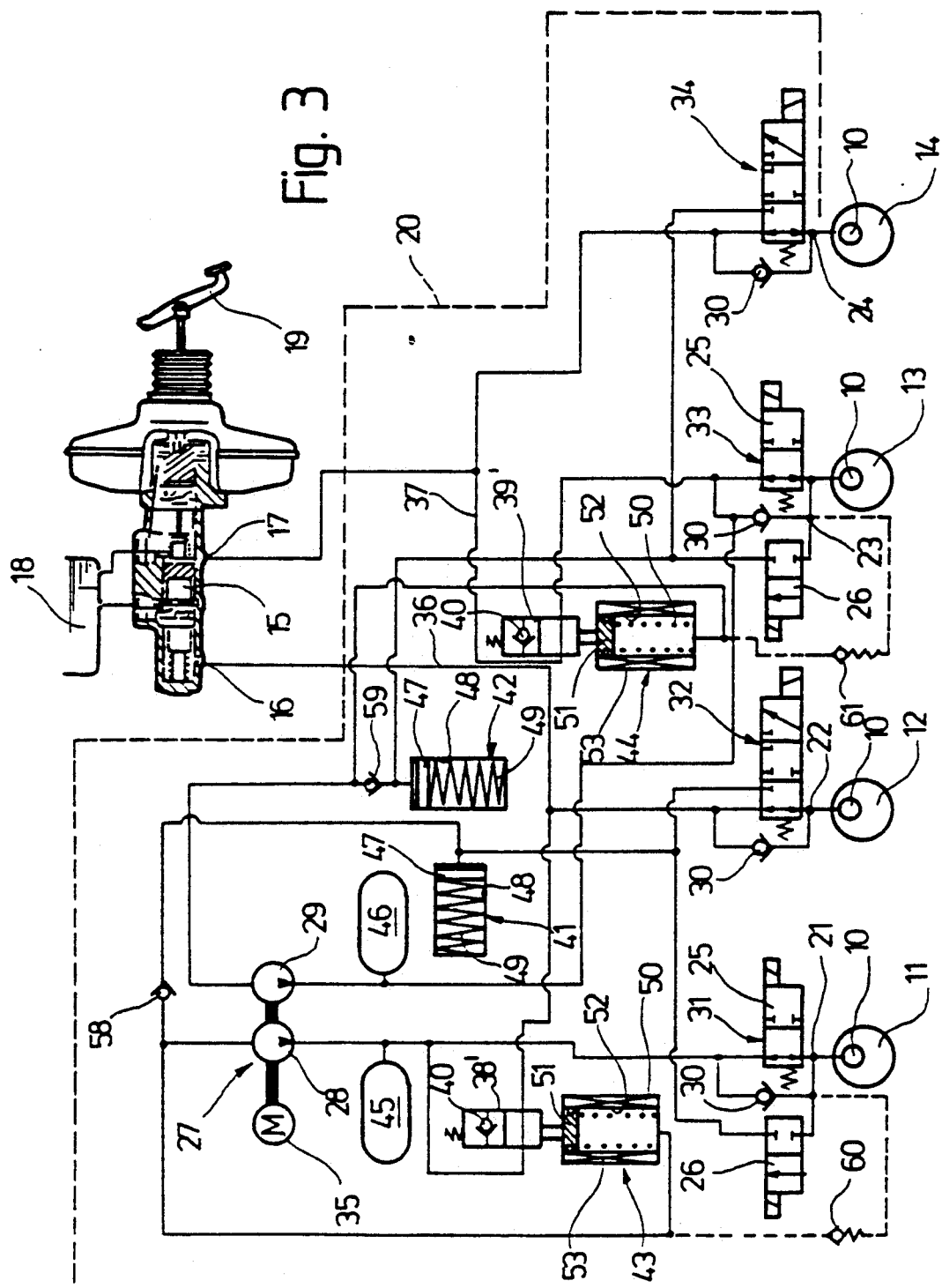

In the dual-circuit brake system shown in FIG. 3, the decoupling of the low-pressure reservoirs 41, 42 is effected not by electromagnetically actuated cutoff valves but rather by one-way check valves 58, 59. The check valves 58, 59 are each incorporated in the connection between the control valves 31, 32 or 33, 34 and the inlet of the associated pump element 28 or 29 of the return pump 27, with their flow direction toward the inlet of pump elements 28, 29. The connection of the low-pressure reservoirs 41, 42 to the pump elements 28 and 29, respectively, is effected on the inlet side of the check valves 58, 59, so that the low-pressure reservoirs 41, 42 are capable of receiving brake fluid upon a brake pressure reduction, without first having to overcome the opening pressure of the check valves 58, 59. The reversing valves 38', 39' in the connecting lines 36, 37 to the master brake cylinder 15 are not actuated electromagnetically here as in FIGS. 1 and 2 but instead are switched over mechanically, in fact as a function of travel, that is, the displacement travel of the reservoir piston 51 of the brake fluid reservoirs 43, 44. As soon as the brake fluid reservoir 43 or 44 is activated, and thus the reservoir piston 51 is moved out of its basic position shown in FIG. 3 by a certain displacement path, the restoring spring of the reversing valve 38' or 39' switches it over, thereby connecting the applicable check valve 40 into the connecting line 36 or 37. The structure and mode of operation of the dual-circuit brake system of FIG. 3 is otherwise identical to that of FIG. 1, and so identical components have the same reference numerals.

Additionally, the dual-circuit brake system of FIG. 1, 2 or 3 can be provided with a fast-fill option, which makes the fastest possible buildup of pressure in the wheel brake cylinder 10 of a spinning driven wheel 11, 13 possible. This kind of fast fill operation is attained—as shown in dashed lines in FIG. 3—with the aid of a hydraulic connection between the brake fluid reservoir 43 or 44 and the outlet channel 21 or 23 for the wheel brake cylinders 10 of the driven wheels 11 or 13; a one-way check valve 60 with a flow direction toward the outlet channel 21 or 23 is disposed in this connection. The brake fluid reservoir 43 or 44 is also embodied as "stronger" so that it is capable of generating a pressure of 10 to 20 bar. In that case, it is advantageous to embody the reservoir piston 51 as a plunger driven by an electric motor. In this dual- circuit brake system, at the onset of the traction control, the wheel brake cylinders 10 of the driven wheels 11, 13 are filled with a large volumetric flow, which is composed of the brake fluid volume that directly reaches the wheel brake cylinders 10 from the brake fluid reservoirs 43 and 44, and of the brake fluid volume that is pumped into the wheel brake cylinders 10 of the driven wheels 11, 13 from the brake fluid reservoir 43 or 44 via the pump element 28 or 29 of the return pump 27 and by the inlet valves 35, in their basic position, of the control valves 31, 33. The quantity pumped by the return pump 27 can thus be designed for a higher pressure range, to compensate for the smaller volumetric capacity.

Figure 4:
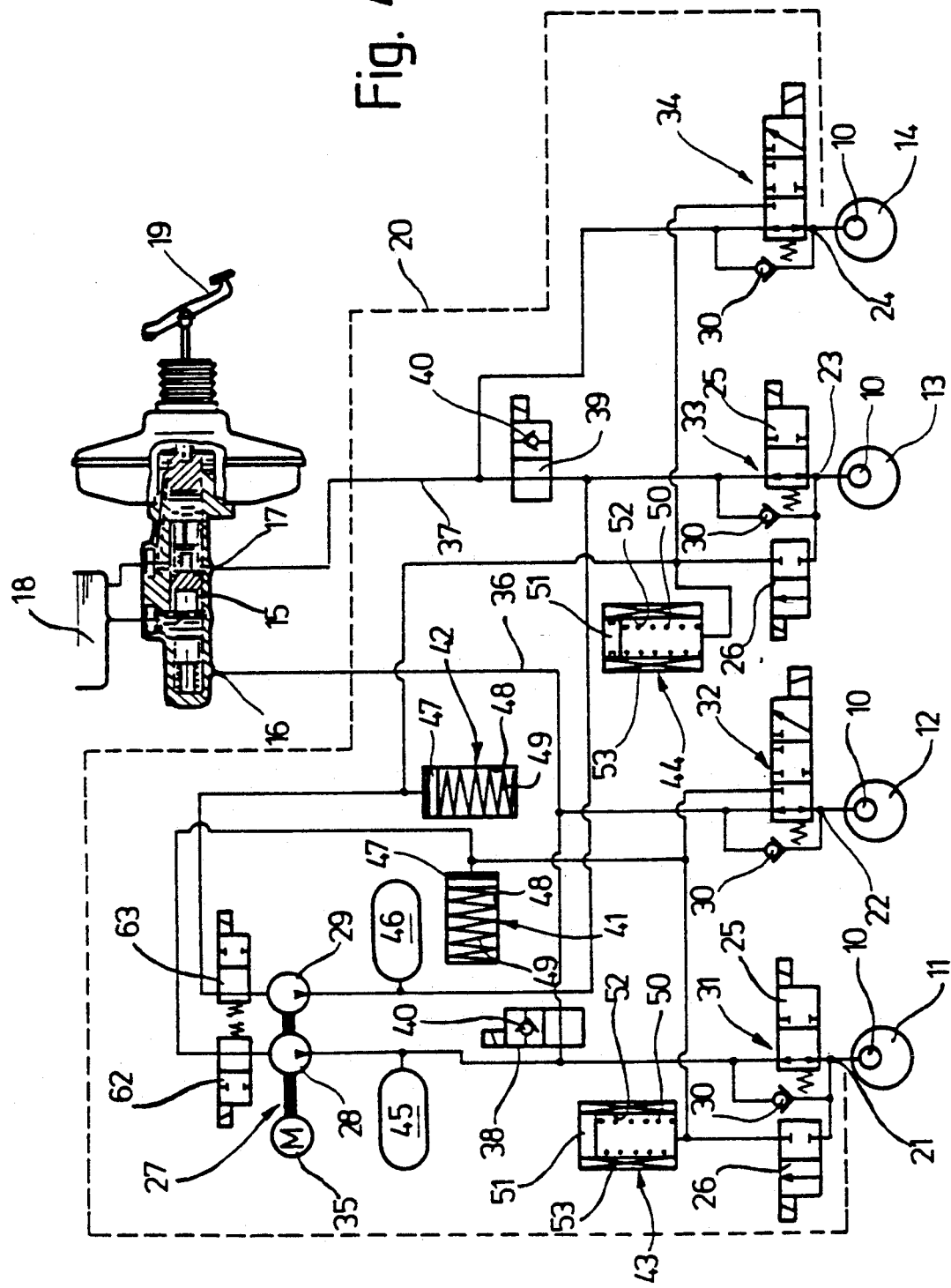

In the dual-circuit brake system shown in a block circuit diagram in FIG. 4, a cutoff valve 62 or 63 embodied as a 2/2-way magnet valve with spring restoration is disposed in the connection between the brake fluid reservoir 43 or 44 and the pump element 28 or 29 of the return pump 27. In their unexcited basic position, the cutoff valves 62, 63 assume their open position, so that both the low-pressure reservoir 41 or 42 and the brake fluid reservoir 43 or 44 communicate with the inlet of the pump element 28 or 29. The cutoff valves 62, 63 also maintain this basic position during the pressure buildup in the traction control mode. With the onset of the traction control mode, the brake fluid reservoir 43 or 44 that belongs to a spinning driven wheel 11 or 13 is activated, and remains so during the entire traction control operation. Once the necessary brake pressure is attained, then the applicable cutoff valve 62 or 63 is reversed to its closing position for pressure holding, so that the reservoirs 41 and 43 or 42 and 44 are respectively disconnected from the pump element 28 or 29. This position of the cutoff valves 62, 63 is also maintained upon pressure reduction, in which additionally the outlet valve 26 of the control valve 31 or 33 is reversed into its open position. The advantages of this dual-circuit brake system concept over that of FIG. 1 is that the brake fluid reservoirs 43, 44 can remain activated via a central energy source during the entire traction control operation and can therefore be made simpler.

Figure 5:
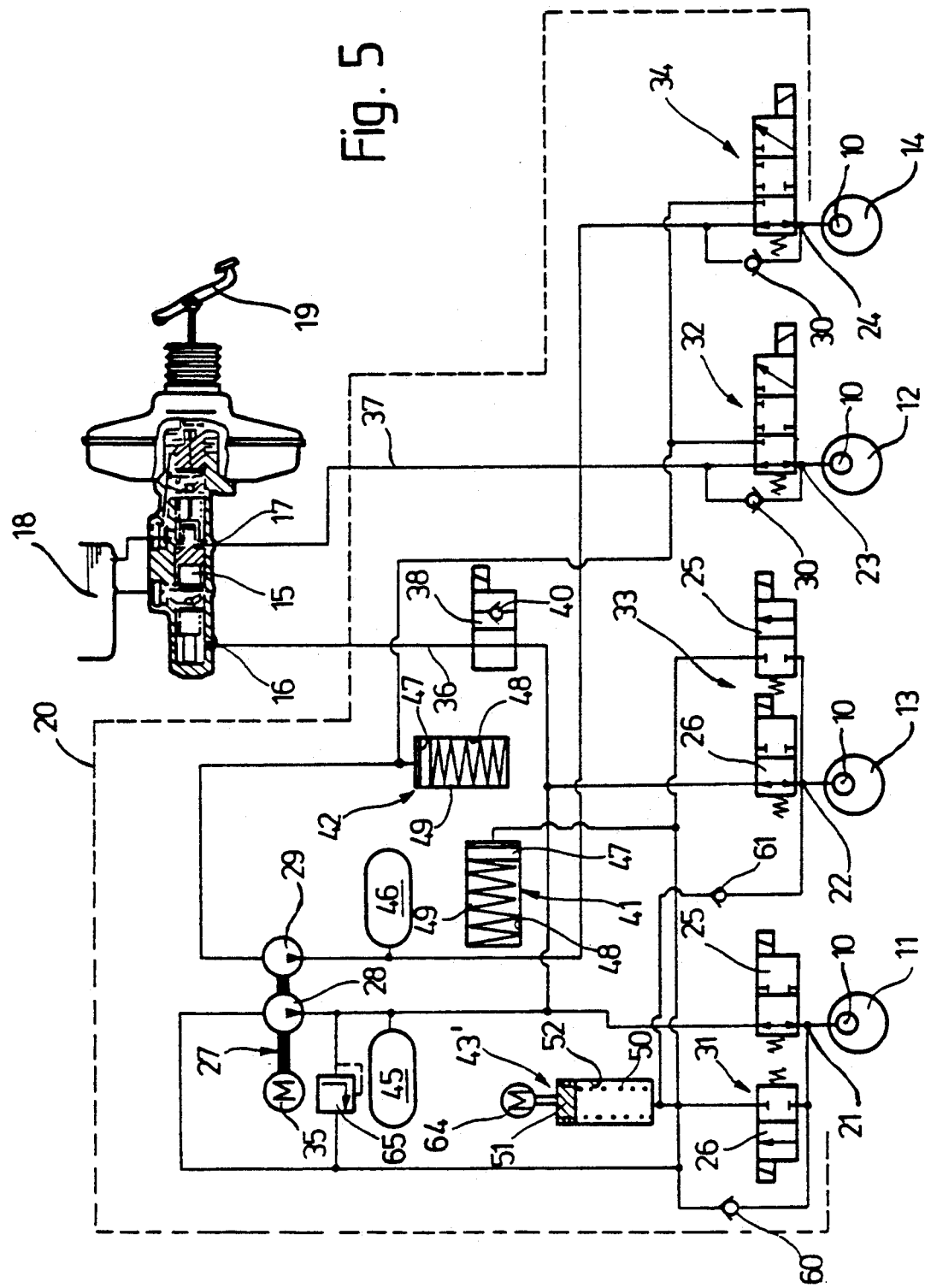
FIGS. 5 and 6 are a block circuit diagram of a dual-circuit brake system with front/rear brake circuit distribution, an anti-skid system and traction control for a passenger car, in accordance with two exemplary embodiments.

FIG. 5 is a block circuit diagram of a hydraulic dual-circuit brake system with front/rear or front-axle/rear-axle brake circuit distribution, an anti-skid system (ABS) and traction control (ASR) for a passenger car. The wheel brake cylinders 10 of the driven wheels 11, 13 are disposed in one brake circuit, and the wheel brake cylinders 10 of the non-driven wheels 12, 14 are disposed in the other brake circuit. Typically, the driven wheels 11, 13 are the rear wheels of the passenger car. In contrast to the dual-circuit brake system with diagonal brake circuit distribution, only one reversing valve 38 is present here, which is disposed in the connecting line 36 between the brake circuit outlet 16 of the master brake cylinder 15 and the control valves 31, 33 disposed in the brake circuit of the driven wheels, or the outlet of the pump element 28 of the return pump 27. Likewise, only one brake fluid reservoir 43' is present, the reservoir piston 51 of which is driven by an electric drive motor 64. The brake fluid reservoir 43' is connected to the inlet of the pump element 28, assigned to the brake circuit of the driven wheels 11, 13, of the return pump 27. Between the outlet and inlet of the pump element 28, a pressure limiting valve 65 is also connected, having an opening direction toward the inlet of the pump element 28. As in the dual-circuit brake system for diagonal brake circuit distribution of FIG. 3, a "fast-fill option" is again provided here for the wheel brake cylinders 10 of the driven wheels 11, 13; as shown in FIG. 3, this option is connected by means of the one-way check valves 60, 61 between the brake fluid reservoir 43' and the wheel brake cylinders 10 of the driven wheels 11, 13. During the entire traction control operation, the brake fluid reservoir 43' remains activated. In the pressure holding state, the inlet valve 25 of the spinning driven wheel 11 or 13 is closed. The same is true in the operating state of pressure reduction, in which additionally the outlet valve 26 is reversed into its opening position. In both operating states, the pump element 28 pumps via the pressure limiting valve 63.

Figure 6:
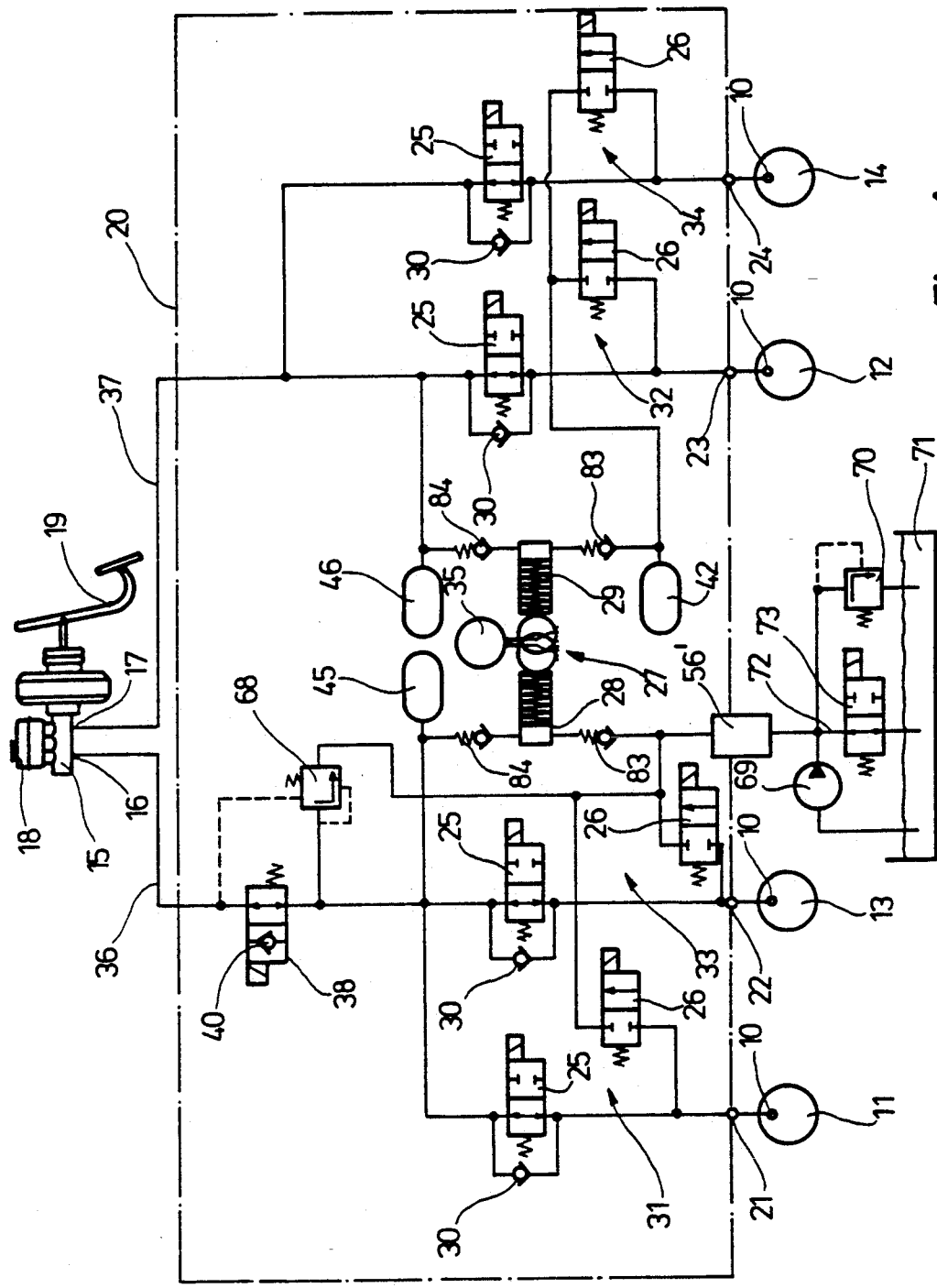

The hydraulic dual-circuit brake system shown in FIG. 6 in the form of a block circuit diagram, having front/rear brake circuit distribution, is designed essentially like the dual-circuit brake system of FIG. 5. Identical components are therefore provided with the same reference numerals. The modifications are on the one hand in terms of the control valves 32, 34 for the non-driven wheels 12, 14, which in this case, like the control valves 31, 33 for driven wheels 11, 13, each comprise one inlet valve 25 and one outlet valve 26. The inlet and outlet valves 25, 26 are embodied as 2/2- way magnet valves with spring restoration. Another modification is that the brake pressure made available in the ASR mode by the pump element 28 of the return pump 27 is limited by a pressure limiting valve 68 that is controlled via the pressure of the master brake cylinder 15. One essential change in the dual-circuit brake system compared with that of FIG. 5 is that as in the brake system of FIG. 2, the low-pressure reservoir and the brake fluid reservoir (41 and 43', respectively, in FIG. 5) are combined into a combination reservoir 56'. The combination reservoir 56' is driven hydraulically, to this end, during the ASR mode, a precharging pump 69 connected to the combination reservoir 56 is activated, its feed pressure being limited to approximately 5 bar by a parallel-connected pressure limiting valve 70. The precharging pump 69 is supplied from a brake fluid reservoir 71. A bypass 72 is associated with the precharging pump 69; a bypass valve 73 that closes the bypass 72 during the ASR mode is incorporated into the bypass 72. The bypass valve 73 is embodied as a 2/2-way magnet valve with spring restoration, which in its unexcited state is in the open position and upon magnet excitation switches into its blocking position. As before, the brake circuit containing the nondriven wheels 12, 14 includes the low- pressure reservoir 42 required for the ABS function. The pump inlet valves and pump outlet valves for the pump elements 28, 29 are provided with reference numerals 84 and 85, respectively.

Figure 8:
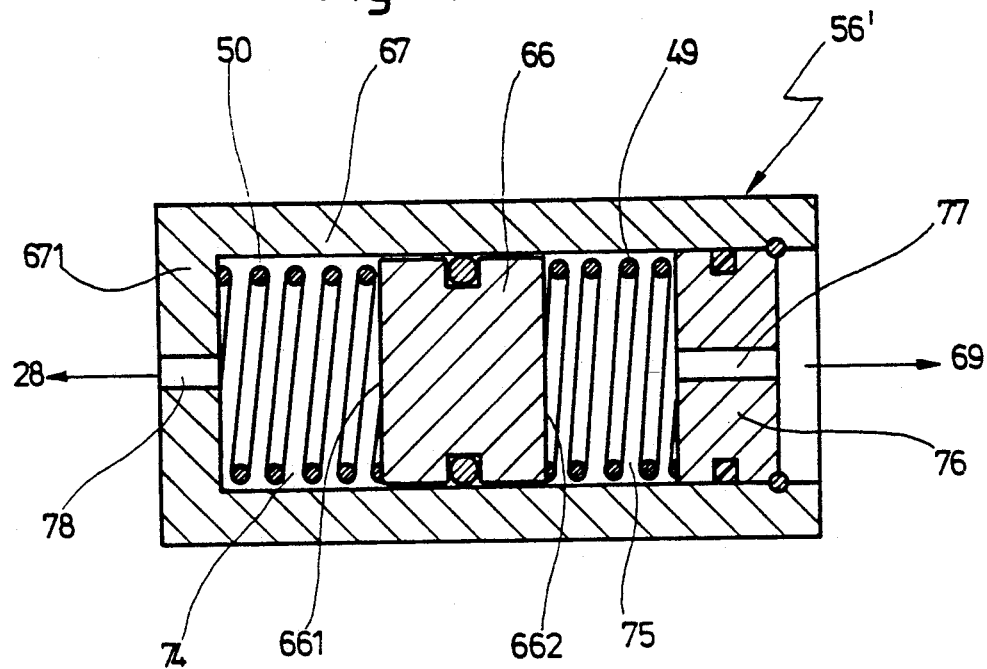
FIGS. 8 and 9 each schematically show a longitudinal section through a combination reservoir in the dual-circuit brake system of FIG. 6 or 7.

The combination reservoir 56' is schematically shown in longitudinal section in FIG. 8. Like the combination reservoir 56 in FIG. 2, it has a reservoir cylinder 67, in which the reservoir piston 66 is guided axially displaceably. With one piston face 661, the reservoir piston 66 defines a reservoir chamber 74, and with its other piston face 662 it defines a spring chamber 75. The spring chamber 75 is closed off, on the end remote from the reservoir piston 66, by a plate 76 in which there is a central connection bore 77, by way of which the spring chamber 75 communicates with the precharging pump 69. The reservoir spring 49 is located in the spring chamber 75, supported at one end on the plate 76 and at the other on the reservoir piston 66. The restoring spring 50 is located in the reservoir chamber 74 and is supported on one end on the reservoir piston 66 and on the other on a bottom 671 that closes off the reservoir cylinder 67 and is integral with it. A central connection opening 78 is provided in the bottom 671; by way of this opening, the reservoir chamber 74 is connected to the inlet side of the pump element 28 of the return pump 27, specifically to the pump inlet valve 83.

Because of this hydraulic drive, generated by the precharging pump 69, of the reservoir piston 66 in the combination reservoir 56', the volume of the reservoir chamber 74 can be compressed and applied by the return pump 27 upstream of the inlet valves 25 for the control valves 31, 33 for the driven wheels 11, 13. While the wheel brake cylinder 10 of a driven wheel 11 or 13 not exhibiting slip is blocked off by the inlet valve 25 of the control valve 31 or 33 that is reversed into the closing position, the brake fluid volume is introduced into the wheel brake cylinder 10 of the slipping driven wheel 13 or 11 via the opened inlet valve 25 of the control valve 33 or 31. During the ASR mode, the precharging pump 69 is switched on for constant operation. After the ASR operation, the "secondary volume" in the spring chamber 75 is expanded into the brake fluid reservoir 71, by means of the bypass valve 72, which drops back into its open position after the ASR operation. As with the other dual-circuit brake systems, the master brake cylinder 15 here is once again blocked off from the brake circuit of the driven wheels 11, 13 by the reversing valve 38 during the ASR operation. Braking initiated by the brake pedal 19 during the ASR mode is possible via the check valve 40, which is operative in the blocking position of the reversing valve 48.

Figure 9:
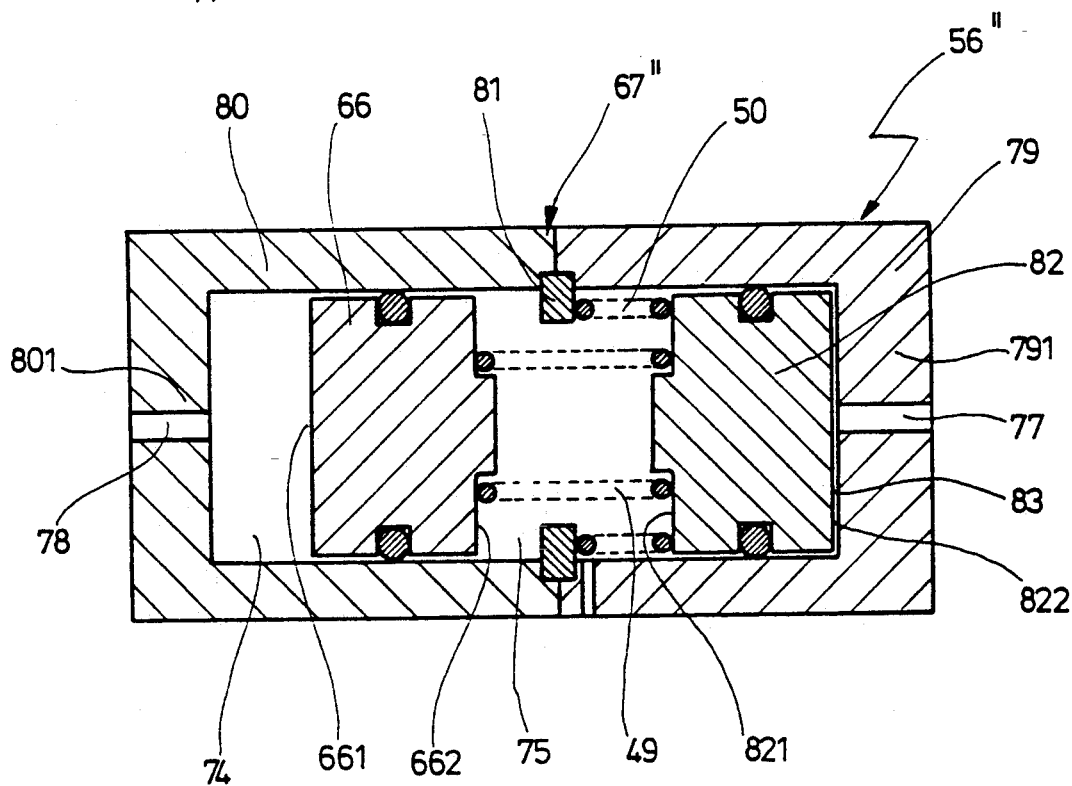

Another embodiment of a combination reservoir 6", which can be used in the brake system of FIG. 6 instead of the combination reservoir 56', is shown in FIG. 9. Any structural parts of this combination reservoir 56" that match those of the combination reservoir 56' of FIG. 8 are provided with the same reference numerals. The reservoir cylinder 67" is in two parts, comprising two cup-shaped housing halves 79, 80, which abut one another with their circular-annular rims and in the abutting position firmly fasten a stop ring 81. The bottom 791 of the housing half 79 again has the connection bore 77 for connecting the precharging pump 69, and the bottom 801 of the other housing half 80 is provided with the central connection opening 78 for the inlet side of the pump element 28 of the return pump 27. The reservoir piston 66, which is axially displaceable in the reservoir cylinder 67", with its piston face 661, again defines the reservoir chamber 74 and with its piston face 662 defines the spring chamber 75. The spring chamber 75 is defined, on its end remote from the reservoir piston 66, by the piston face 821 of a control piston 82, which is disposed axially displaceably in the reservoir cylinder 67'. The reservoir spring 49 is again supported between the reservoir piston 66 on the one hand and the control piston 82 on the other. In contrast to the combination reservoir 56' of FIG. 8, the restoring spring 50 is likewise disposed in the spring chamber 75, coaxially with the reservoir spring 49, and is supported at one hand on the control piston 82 and at the other on the stop ring 81. With its piston face 822 remote from the spring chamber 75, the control piston 82 along with the bottom 791 of the housing half 79 defines a control chamber 83, which is connected to the precharging pump 69 via the connection bore 77. This combination reservoir 56" has the advantage that even in the case of a defect, for instance if the pressure in the control chamber 83 can no longer be reduced because of a defective bypass valve 73, the function of the reservoir chamber 74 will be maintained.

Figure 7:
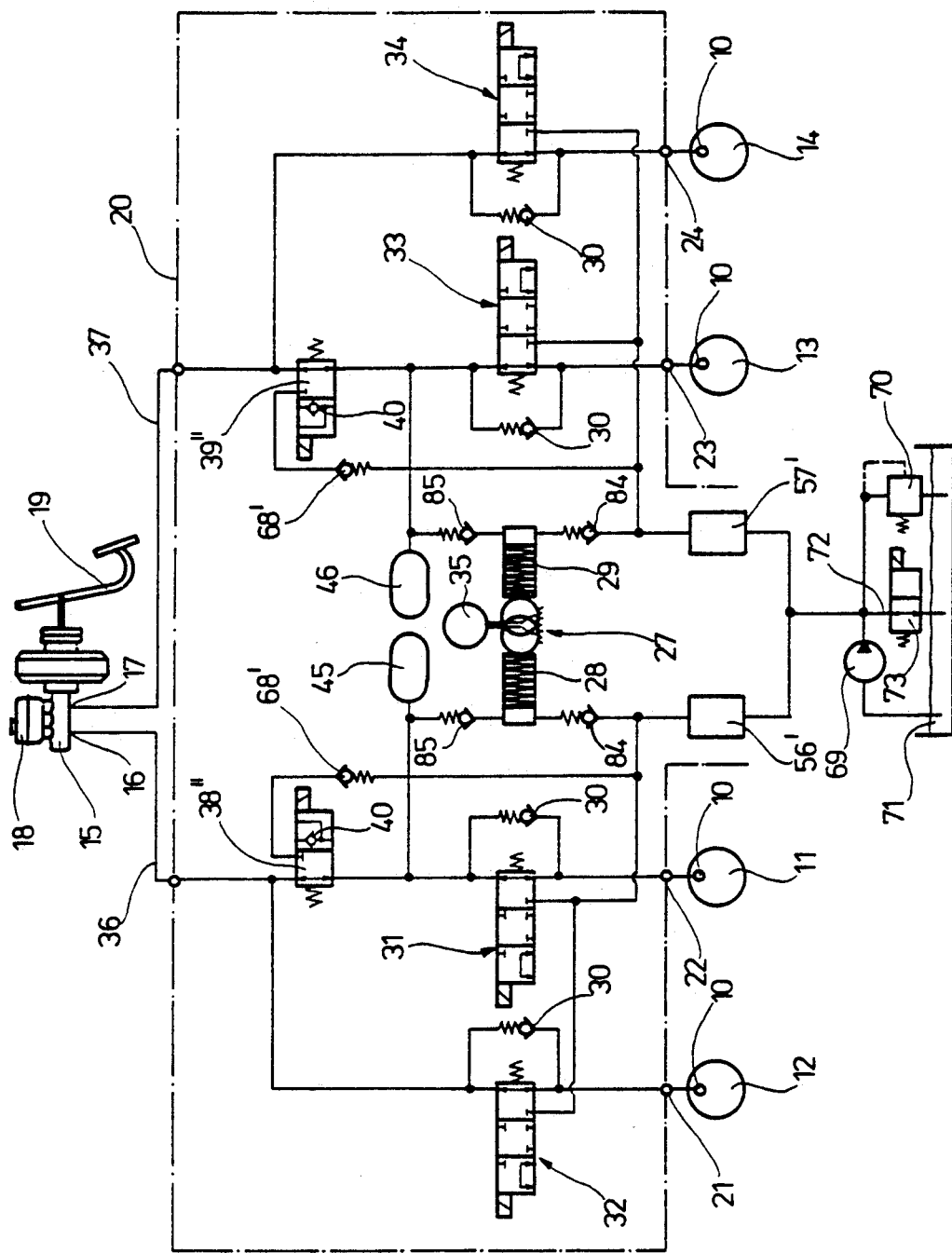
FIG. 7 is a block circuit diagram of a dual-circuit brake system with diagonal brake circuit distribution in accordance with a further exemplary embodiment.

The dual-circuit brake system of FIG. 6, described above, can naturally be designed for diagonal brake circuit distribution as well. An exemplary embodiment of a dual-circuit brake system of this kind with diagonal brake circuit distribution is shown in FIG. 7; except for the diagonal brake circuit distribution, its function matches the dual-circuit brake system of FIG. 6. Identical components are therefore provided with the same reference numerals.

Because of the drive wheels 11, 13, one located in each brake circuit, the second brake circuit must also contain a brake fluid reservoir, which is again combined with the low-pressure reservoir 42 of FIG. 6 needed for the ABS mode to make a combination reservoir 57', and which is identical to the brake fluid reservoir 56' and thus may be embodied in accordance with one of the versions shown in FIG. 8 or FIG. 9. Like the first combination reservoir 56', the second combination reservoir 57' communicates by its reservoir chamber 74 (FIG. 8 or 9) with the pump element 29 via its inlet valve 84, and it communicates by its spring chamber 75 (FIG. 8) or its control chamber 83 (FIG. 9) with the outlet of the precharging pump 69.

To disconnect the master brake cylinder 15 during traction control, a reversing valve 39" should also be provided in the connecting line 37 to the brake circuit outlet 17 of the brake cylinder 15. This reversing valve 39" can be embodied like the reversing valve 38 of FIG. 6. The control valve 32, 34 for the nondriven wheels 12, 14 would then have to communicate directly with the brake circuit outlets 16 and 17 of the master brake cylinder 15. In the dual-circuit brake system of FIG. 7, the two reversing valves 38" and 39" are embodied as 3/2-way magnet valves with spring restoration, which are incorporated into the connecting lines 36, 37 between the control valves 31, 33 for the driven wheels 11, 13 and the connections of the control valve 32, 34 for the nondriven wheels 12, 14. The reversing valves 38" and 39", in their basic position, connect the connecting lines 36, 37 directly to the control valves 31, 33, while in their reversed position they connect the connecting lines 36, 37 to the control valves 31, 33 via the check valves 40. The check valves 40 in turn assure that during the ASR mode, braking is possible into the wheel brake cylinders 10 of the driven wheels 11, 13 via the master brake cylinder 15 by actuation of the brake pedal 19. In their reversed position, the two reversing valves 38" and 39" additionally connect the outlets of the pump elements 28, 29, each via a respective pressure limiting valve 68", to the reservoir chamber 74 of the two combination reservoirs 56' and 57'. The pressure limiting valves 68' again limit the system pressure during the traction control mode.

In the dual circuit brake system of FIG. 7, the control valves 31-34 are embodied as 3/3-way magnet valves with spring restoration. This represents a simplification of the control valves 31-34, but it has the disadvantage that unlike the embodiment of the control valves 31-34 with one inlet valve 25 and one outlet valve 26 as in FIG. 6, an equilibrium of fluid between the master brake cylinder 15 and the reservoir chamber 74 (FIG. 8) of the combination reservoirs 56', 57' by applying current to the outlet valves 26 is not possible. This kind of fluid equilibrium may be necessary under some circumstances, if a residual volume remains in the reservoir chamber 74 (FIG. 8) of the fluid reservoirs 56' and 57' after the termination of the traction control mode. With control valves 31, 33 for the driven wheels 11, 13 subdivided into the inlet valve 25 and outlet valve 26, in contrast to the embodiment of the control valves 31, 33 as 3/3-way magnet valves, the termination routine in traction control can also be achieved more simply, because in that case the inlet and outlet valves 25, 26 need merely be switched for passage through them. Preferably, the control valves 31, 33 for the driven wheels 11, 13 are therefore embodied not as 3/3-way magnet valves as in FIG. 7, but rather by means of one inlet and outlet valve 25, 26 each, as in FIG. 6.

The invention is not limited to the exemplary embodiments of the dual-circuit brake system that are described here. For instance, the dual-circuit brake system shown in FIG. 1 may also be operated during traction control in such a way that during all of the traction control operation, the brake fluid reservoir 43 or 44 of the particular driven wheel 11 or 13 that is spinning is activated, and the outlet valve 26 of the control valve 31 or 33 is triggered incrementally for pressure holding and is opened for pressure reduction. By regulating the current of the electric motor 35 of the return pump 27, the quality of control with respect to brake pressure built up in the wheel brake cylinders 10 of the driven wheels 11, 13 can also be improved. Reducing the current produces a smaller supply quantity. In pressure buildup, the electric motor 35 is in operation, while in pressure holding and pressure reduction is switched off. In pressure reduction, the outlet valve 26 of the control valve 31 or 33 is additionally opened as well.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic dual-circuit brake system with an anti-skid system and traction control for motor vehicles including driven and nondriven wheels, having a master brake cylinder with first and second brake circuit outlets (16, 17) for controlling a brake pressure by brake pedal actuation; a four-channel hydraulic unit with first, second, third and fourth outlet channels (21, 22, 23, 24), said first and second outlet channels are distributed to first and second brake circuits connected to said first brake circuit outlet and said third and fourth outlet channels are distributed to third and fourth brake circuits connected to said second brake circuit outlet for connection with first, second, third, and fourth wheel brake cylinders (11, 12, 13, 14) of the driven and nondriven wheels, first, second, third, and fourth electromagnetic input control valves (31, 32, 33, 34) having an inlet connected respectively with said first, second, third and fourth brake circuits and an outlet connected to said first, second, third and fourth outlet circuits respectively for controlling a brake pressure dependent on wheel slip in the wheel brake cylinders, each of said first, second, third, and fourth electromagnetic input control valves (31, 32, 33, 34) include an output connected respectively with said first, second, third and fourth outlet channels (21, 22, 23, 24) and each of said first and second electromagnetic input control valves include an inlet connected to a first connecting line (36) connected to said first brake circuit outlet and each of said third and fourth electromagnetic input control valves include an inlet connected to a second connecting line (37) connected with said second brake circuit outlet of the master brake cylinder, a first reversing valve (38") disposed in said second brake circuit between said first brake circuit outlet of the master brake cylinder and the inlet of said second electromagnetic input control valve assigned to said second brake circuit which is assigned to a first driven wheel; a second reversing valve (39") disposed in said third brake circuit between said second brake circuit outlet of the master brake cylinder and the inlet of said third electromagnetic input control valve assigned to said third brake circuit which is assigned to a second driven wheel, each of said reversing valves is triggered during a traction control operation, a precharging pump (69) having an inlet connected to a brake fluid reservoir (71) and an output connected with an input reservoir of first and second combination reservoirs (56', 57'), a return pump (27) including first and second pump elements (28, 29), said first and second pump elements each include an inlet connected with an outlet reservoir of each of said first and second combination reservoirs, said first pump element having an outlet connected with a first damping chamber (45) and to said second brake circuit between said first reversing valve (38") and said second electromagnetic control valve (31), said second pump element having an outlet connected with a second damping chamber (46) and to said third brake circuit between said second reversing valve (39") and said third electromagnetic control valve (33), said first combination reservoir having a first outlet connected with a connection to each of said first and second electromagnetic control valves and to a connection of said first reversing valve (38"), said second combination reservoir having a second outlet connected with a connection to each of said third and fourth electromagnetic control valves (33, 34) and to a connection with said second reversing valve, during traction control of one of the driven wheels either the first or second reversing valve disconnects the master brake cylinder to the brake circuit so that the driven wheels are controlled by the reversing valve, and the first and fourth electromagnetic control valves communicate directly with the master brake cylinder.

2. A hydraulic dual-circuit brake system as claimed in claim 1 which includes a bypass line (72) from the output of the precharging pump to the reservoir (71), a bypass control valve (73) in said bypass line, said bypass control valve blocks fluid flow back to the reservoir (71) during traction control and opens said bypass control valve subsequent to traction control.

3. A hydraulic dual circuit brake system as claimed in claim 1 in which each of said first and second combination reservoirs include a reservoir cylinder (67) having a closed end and an open end, a chamber in said cylinder, an end plate (76) which closes said open end to form a piston (66) in said chamber which divides the chamber into first and second reservoir chambers (74, 75), a first spring (50) in said reservoir chamber (74), a second spring (49) in said second chamber (75), said reservoir cylinder (67) includes a central connection opening (78) in said closed end of said reservoir cylinders which extends to said first reservoir, and a central connection bore in said end plate which extends to said second reservoir chamber.

4. A hydraulic dual circuit brake system as claimed in claim 2 in which each of said first and second combination reservoirs include a reservoir cylinder (67) having a closed end and an open end, a chamber in said cylinder, an end plate (76) which closes said open end to form a piston (66) in said chamber which divides the chamber into first and second reservoir chambers (74, 75), a first spring (50) in said reservoir chamber (74), a second spring (49) in said second chamber (75), said reservoir cylinder (67) includes a central connection opening (78) in said closed end of said reservoir cylinders which extends to said first reservoir, and a central connection bore in said end plate which extends to said second reservoir chamber.

* * * * *